United States Patent
Dorais

(10) Patent No.: US 11,738,891 B1
(45) Date of Patent: Aug. 29, 2023

(54) MODULAR ARTIFICIAL-GRAVITY ORBITAL REFINERY SPACECRAFT

(71) Applicant: United States of America as Represented by the Administrator of NASA, Washington, DC (US)

(72) Inventor: Gregory Allen Dorais, San Jose, CA (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 304 days.

(21) Appl. No.: 17/138,799

(22) Filed: Dec. 30, 2020

(51) Int. Cl.
| | |
|---|---|
| *B64G 4/00* | (2006.01) |
| *B64G 1/28* | (2006.01) |
| *B64G 1/40* | (2006.01) |
| *E21C 51/00* | (2006.01) |
| *B64G 1/64* | (2006.01) |
| *B64G 1/10* | (2006.01) |
| *B25J 15/00* | (2006.01) |

(52) U.S. Cl.
CPC .............. *B64G 4/00* (2013.01); *B64G 1/281* (2013.01); *B64G 1/40* (2013.01); *B64G 1/646* (2013.01); *E21C 51/00* (2013.01); *B25J 15/00* (2013.01); *B64G 2001/1092* (2013.01); *B64G 2004/005* (2013.01)

(58) Field of Classification Search
CPC .. B64G 2001/1092; B64G 1/281; B64G 1/40; B64G 1/646; B64G 4/00; B64G 2004/005; B25J 15/00; E21C 51/00
USPC ...................................................... 244/171.1
See application file for complete search history.

(56) References Cited

U.S. PATENT DOCUMENTS

| | | | | |
|---|---|---|---|---|
| 3,744,739 A | * | 7/1973 | Weaver .................. | B64G 1/646 244/172.4 |
| 5,305,970 A | * | 4/1994 | Porter ...................... | B64G 1/12 244/135 R |
| 9,266,627 B1 | | 2/2016 | Anderson et al. | |
| 9,796,486 B1 | | 10/2017 | Illsley et al. | |
| 10,081,444 B2 | * | 9/2018 | Dharmaraj ............... | B64G 1/60 |
| 10,307,970 B2 | | 6/2019 | Snyder et al. | |
| 11,142,347 B1 | * | 10/2021 | Sedwick .................. | B64G 1/66 |
| 11,155,366 B2 | * | 10/2021 | Helvajian ............... | B64G 99/00 |
| 2014/0263843 A1 | * | 9/2014 | Cappelli ................. | B64G 1/002 244/159.4 |

(Continued)

*Primary Examiner* — Brady W Frazier
(74) *Attorney, Agent, or Firm* — Rhys W. Cheung; Robert M. Padilla; Trenton J. Roche

(57) ABSTRACT

A refinery spacecraft comprises a hub section defining a longitudinal axis, an excavator segment to convey material into the hub section, first, second and third rotary ring segments rotatable about the hub section with adjustable speed and direction, each rotary ring segments comprising three modules configured to carry out refining or storage processes and wherein two of the three modules in each rotary ring segment have adjustable angular positions relative to the longitudinal axis. Methods of collecting and refining substances from an asteroid, derelict orbiting spacecraft or other space junk, can comprise attaching a refining spacecraft to an asteroid, extracting material from the asteroid, transferring material into a refining hub, transferring material to refining rings orbiting the refining hub, and controlling orbiting of the refining rings about the hub to establish and maintain angular momentum of the refining spacecraft at a stable condition.

20 Claims, 7 Drawing Sheets

(56) References Cited

U.S. PATENT DOCUMENTS

2019/0023419 A1* 1/2019 Helvajian .............. B64G 99/00
2021/0387749 A1* 12/2021 Bloxton ................... B64G 1/12

* cited by examiner

MODULAR ARTIFICIAL-GRAVITY ORBITAL REFINERY SPACECRAFT

ORIGIN OF INVENTION

The invention described herein was made by an employee of the United States Government and may be manufactured and used by or for the Government of the United States of America for governmental purposes without the payment of any royalties thereon or therefor.

BACKGROUND OF THE INVENTION

Technical Field of the Invention

The present disclosure relates generally to spacecraft for outer space exploration and commercialization.

More specifically, the present disclosure relates to spacecraft for performing refining and casting products from mining operations in low or zero gravity environments.

Description of the Prior Art

The human population continues to grow with a corresponding increasing negative impact on the environment and increasing probability of conflict and other catastrophic global events. The available mass, energy, and room for habitation in the solar system are essentially unlimited with respect to the Earth, but are essentially untapped. The National Space Policy Directive 1, Dec. 14, 2017, amends the national space policy directing NASA to "Lead an innovative and sustainable program of exploration with commercial and international partners to enable human expansion across the solar system and to bring back to Earth new knowledge and opportunities."

Throughout the history of the universe, stars, planets, and proto-planets have served as natural refineries by means of a stratification process where concentrations of elements increase when subject to sufficient heat and gravity where the heavier elements sink to the core of the body and the lighter elements rise. Due to the low mass and heat of asteroids, this process generally does not occur.

For thousands of years, humans on Earth have refined elements by means of fire and Earth's gravity. The Bronze Age is a notable example of this. Modern refineries by and large continue to refine solids, liquids, and gases using heat and gravity. On Earth, raw materials and energy are limiting factors in mining and refining Earth resources. In space, energy is abundant relative to mass. Mass is thus is a valuable commodity, including with water, which can be used for propellant, radiation shielding, life support, and processing other materials. On Earth, significant effort is performed to select unrefined resources that are rich in a desired substance to be refined. In space, essentially every substance in a refined and accessible form is valuable, so every kilogram of an asteroid can be refined, but mining and refining efforts can focus on particular substances of value.

In view of the foregoing, there has been considerable interest in the exploration and mining of asteroids with spacecraft. Examples of spacecraft are described in U.S. Pat. No. 9,266,627 to Anderson et al.; U.S. Pat. No. 9,796,486 to Illsley et al.; and U.S. Pat. No. 10,307,970 to Snyder et al.

SUMMARY OF THE INVENTION

Problems to be solved with building and operating asteroid refineries in space include, among other things, (1) the need to reduce human-labor intensive activities; (2) the need to reduce the frequency of maintenance and the associated need for requiring rapid fault response times in order to maintain operation; and (3) the need for gravity in order for refining operations to function properly. Such problems can be particularly present in centrifugal refining processes. Centrifuges can be used to accelerate refining processes for special cases, such as uranium enrichment. However, centrifuges introduce challenges for operating in space that are not relevant on Earth, such as requiring propellant to change rotation rate due to the conservation of angular momentum as well as controlling the attitude of the centrifuge in space due to the gyroscopic force (angular momentum) of the centrifuge.

The present disclosure can help provide solutions to these and other problems by providing systems, devices and methods relating to in-situ mining and refining of asteroids enabled by the design concepts described in the present disclosure. Such design concepts of the present disclosure can produce resources for accomplishing the above-mentioned NASA directive while reducing the impact humans have on the Earth's environment.

This present disclosure describes concepts related to spacecraft for refining in situ the mass from celestial bodies, including asteroids and Mars moons, orbiting in microgravity conditions beyond Earth. The present disclosure also applies to recycling orbiting manufactured products that are no longer needed, e.g., derelict satellites, that are orbiting in space. Thousands of tons of mass are launched into orbit every year and the amount is expected to dramatically increase as launch costs decrease. After these orbiting materials serve their useful purpose, they usually become "space junk" left to orbit for extended periods or burn up in the Earth's atmosphere if left in a low-Earth orbit. This space junk consists of a wide range of materials (e.g., metals, minerals, elements) that can be recycled by means of various refining processes that convert this junk into products that are useful in orbit, eliminating launch costs and cost of producing these products on Earth.

The spacecraft concepts described herein can be scaled for a wide array of applications, such as designs that are less than approximately ten meters to those in excess of one hundred meters in diameter. However, other sized bodies can be used with the methods and systems of the present disclosure.

The refining and recycling processes can include separating input masses, e.g., asteroid material or satellite material, into one or more of their atomic elements and compounds in gas, liquid, or solid states, and storing the refined material in storage tanks for reuse in the refining process as well as transport to local orbiting manufacturing facilities, back to Earth, or anywhere else in the solar system. Some of the refined substances can be suitable for use as propellants, e.g., hydrogen, oxygen, and methane. The refining process can produce additional mining and refinery equipment. For instance, in a bootstrap development process, a refinery can be used locally to create additional and larger mining equipment and refinery modules to operate additional mines, potentially increasing material production exponentially. Also, additional refinery storage tanks can be locally produced by refinery and construction modules. These storage tanks can subsequently be used for refined material storage and transport for the construction of orbiting space habitats, among other things.

As such, the present disclosure can help solve the problems referenced above and other problems by (1) providing a modular spacecraft that can be coupled with refining modules for refining or recycling different types of materials; (2) providing a spacecraft platform that can generate artificial gravity; (3) providing a spacecraft comprised of rotating rings, each generating artificial gravity and angular momentum, but combined on the spacecraft platform have a near-zero angular momentum such that the spacecraft platform axis hub need not rotate or can rotate at the rate of the object the spacecraft platform is attached to and this attachment point is not subject to torques due to the rotating rings such that the spacecraft platform can freely rotate with the object it is attached to; and (4) providing a spacecraft platform that can self-balance to accommodate (a) different sized modules and (b) modules having moving or shifting loads.

In an example, an orbital refinery spacecraft can comprise a hub section defining a longitudinal axis, an excavator segment coupled to the hub section such that the excavator segment is configured to prepare and convey raw material into the hub section, a first rotary ring segment configured to rotate about the hub section in a first direction and comprising a first refining module, a second refining module, and a third refining module, wherein a first angular position between the first refining module and the second refining module relative to the longitudinal axis is adjustable and a second angular position between the first refining module and the third refining module relative to the longitudinal axis is adjustable, and a second rotary ring segment configured to rotate about the hub section in a second direction opposite the first direction and comprising a fourth refining module, a fifth refining module, and a sixth refining module, wherein a third angular position between the fourth refining module and the fifth refining module relative to the longitudinal axis is adjustable and a fourth angular position between the fourth refining module and the sixth refining module relative to the longitudinal axis is adjustable, and a third rotary ring segment configured to rotate about the hub section in either direction and comprising a first storage module, a second storage module, and a third storage module for raw or refined materials, wherein a fifth angular position between the first storage module and the second storage module relative to the longitudinal axis is adjustable and a sixth angular position between the first storage module and the third storage module relative to the longitudinal axis is adjustable.

In another example, a method of collecting and refining substances from an asteroid can comprise attaching a refining spacecraft to a surface of the asteroid, extracting material from the asteroid, transferring the material into a refining hub, transferring the material from the refining hub to a plurality of refining rings orbiting the refining hub, and controlling orbiting of the plurality of refining rings about the hub to establish and maintain angular momentum of the refining spacecraft at a stable condition.

In an additional example, a method of controlling angular momentum of a refining spacecraft in a reduced gravity environment can comprise landing the spacecraft on a surface of a celestial body to be mined, contra-rotating first and second refining ring segments about a central axis of the spacecraft to generate artificial gravity in the first and second refining ring segments, moving material extracted from the celestial body into first and second refining modules of the first refining ring segment, and adjusting a relative position between the first and second refining modules relative to the central axis to adjust the angular momentum of the refining spacecraft.

DETAILED DESCRIPTION OF THE INVENTION

Figure 1:
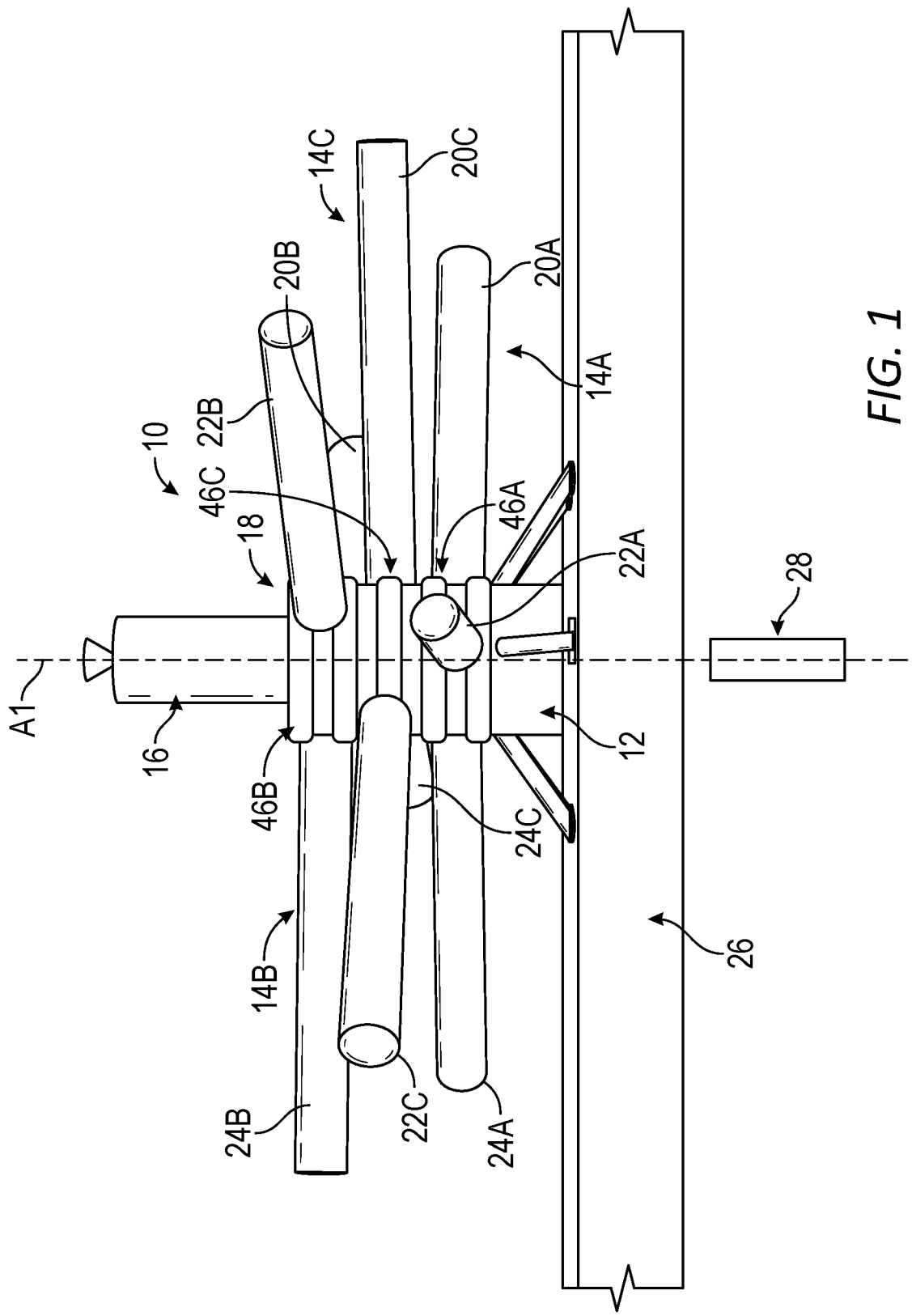
FIG. 1 is a perspective view of an orbital refinery spacecraft of the present disclosure comprising an excavator segment, a plurality of refinery ring segments, a plurality of storage ring segments, and a multi-purpose transfer vehicle, according to some embodiments.

FIG. 1 is a perspective view of a modular artificial-gravity orbital refinery spacecraft (MAGORS) 10 of the present disclosure comprising excavation segment 12, refinery ring segments 14A and 14C, storage ring segment 14B, and multi-purpose transfer vehicle (MPTV) 16. Refinery ring segments 14A and 14C, and storage ring segment 14B, can be attached to hub axle segment 18. Refining ring segment 14A can comprise refining modules 20A, 22A and 24A, attached to hub ring 46A. Refining ring segment 14C can comprise refining modules 20C, 22C and 24C, attached to hub ring 46C. Storage ring segment 14B can comprise storage modules 20B, 22B and 24B, attached to hub ring 46B. Hub rings 46A and 46C for refining rings 14A and 14C, and hub ring 46B for storage ring 14B can be attached to hub axle segment 18 (see FIG. 4). Hub axle segment 18 can run along longitudinal axis A1 of MAGORS 10. The top of hub axle segment 18 can comprise a spacecraft docking port and the bottom of the axle can attach to excavation segment 12. Hub rings 46A-46C of the two refinery rings 14A and 14C, and storage ring 14B can independently rotate around hub axle segment 18.

MAGORS 10 can be engaged with a surface of asteroid 26 or operate in outer space. Excavation segment 12 can be configured to prepare (e.g., crush, shred, filter) material from asteroid 26 for refining. Excavation segment 12 can include excavator tool 28 that can be driven into asteroid 26 for subterranean excavation, and can be remotely controlled or controlled via a tether or linkage. As discussed in greater detail herein, excavation segment 12 can comprise a spacecraft in addition to or instead of excavator tool 28 that is configured to retrieve material from asteroid 26 and/or scrap orbiting in outer space, such as derelict satellites. MAGORS 10 can process such materials in situ in outer space or on an asteroid 26. Said spacecraft can thus be configured to feed material into excavation segment 12. Processing of such materials can occur within refinery ring segments 14A and 14C storage ring segment 14B. Processing of such materials can include refining, storing and manufacturing, as well as other processes related to transforming raw materials of asteroid 26 or outer space scrap into useful raw materials, useful products, useful energy sources, etc. As such, as described herein, refining and storage modules 20A, 22A, 24A, 20B, 22B, 24B, 20C, 22C, and 24C (hereinafter "20A-24C") can comprise modules that can be configured for reducing (e.g., pulverizing, grinding, separating), refining (heating, straining, filtering, centrifuging), storing and manufacturing (e.g., forming, cutting, bending, drilling). In additional examples, MAGORS 10 can be configured to operate with other celestial bodies than asteroid 26. MAGORS 10 can also be configured to manufacture MAGORS components so that replacement parts and additional MAGORS can be constructed in situ. These additional MAGORS components can be constructed using in situ materials and can be larger than the MAGORS used to construct these components. Furthermore, in situ constructed MAGORS components can be larger than anything that could be launched from Earth with current launch vehicle technologies.

Refinery ring segments 14A, and 14C can be rotated about axis A1 to generate artificial gravity so that refining processes can be carried out in refining modules 20A, 22A, 24A, 20C, 22C, and 24C. Refinery ring segments 14A and 14C can be used with modular refining modules 20A, 22A, 24A, 20C, 22C and 24C and storage modules 20B, 22B and 24B such that different materials can be refined, different refining processes can be carried out, and different amounts of materials can be stored. MAGORS 10 can be configured to adjust the artificial gravity levels in the refinery modules 20A, 22A, 24A, 20C, 22C, and 24C to maintain MAGORS 10 in a stable and balanced operation. In particular, MAGORS 10 can adjust the rotational speed and direction of refinery ring segments 14A, 14B and 14C relative to axis A1 and the angular spacing of modular refining modules 20A-24C relative to axis A1 so as to maintain zero angular momentum of MAGORS 10, for example. Additionally, MAGORS 10 can be configured to adjust the angle between the refinery and storage modules 20A-24C on each ring segment 14A, 14B, and 14C while the rings rotate to maintain the balance and minimizing shaking of the MAGORS 10 while various amounts of mass move within the refinery and storage modules 20A-24C.

In an example, material from asteroid 26 can be retrieved using excavator tool 28. The material can be moved axially upward (relative to the orientation of FIG. 1) into hub axle segment 18 via appropriate transportation means. From within hub axle segment 18, the material can continue to move axially upward to align with one of refinery ring segments 14A and 14C, or the storage ring segment 14B. The material can flow into one of refinery ring segments 14A and 14C to be processed (e.g., refined) into different materials. The processed materials can be moved into another of refinery ring segments 14A and 14C, or the storage ring segment 14B. Thus, as MAGORS 10 operates, the center of mass of MAGORS 10 and each of ring segments 14A, 14B and 14C changes as material moves throughout the system. MAGORS 10 can adjust the rotation (e.g., speed and direction) of refinery ring segments 14A and 14C, and storage ring segment 14B, and the spacing between (e.g., angular position relative to axis A1) refining modules and storage modules 20A-24C in order to: (1) maintain the desired artificial gravity levels in refinery ring segments 14A and 14C, (2) dynamically balance MAGORS 10, (i.e., it does not shake while its ring segments rotate), and (3) maintain a near-zero angular momentum so that MAGORS 10 does not apply a torque where it is attached to an asteroid 26. By enabling MAGORS to maintain a near-zero angular momentum while its ring segments 14A-14C rotate, MAGORS will (A) remain properly aligned perpendicular to the asteroid 26 without rotating the asteroid or detaching itself, or (B) maintain a relative orientation in space when not attached to an asteroid.

Figure 2:
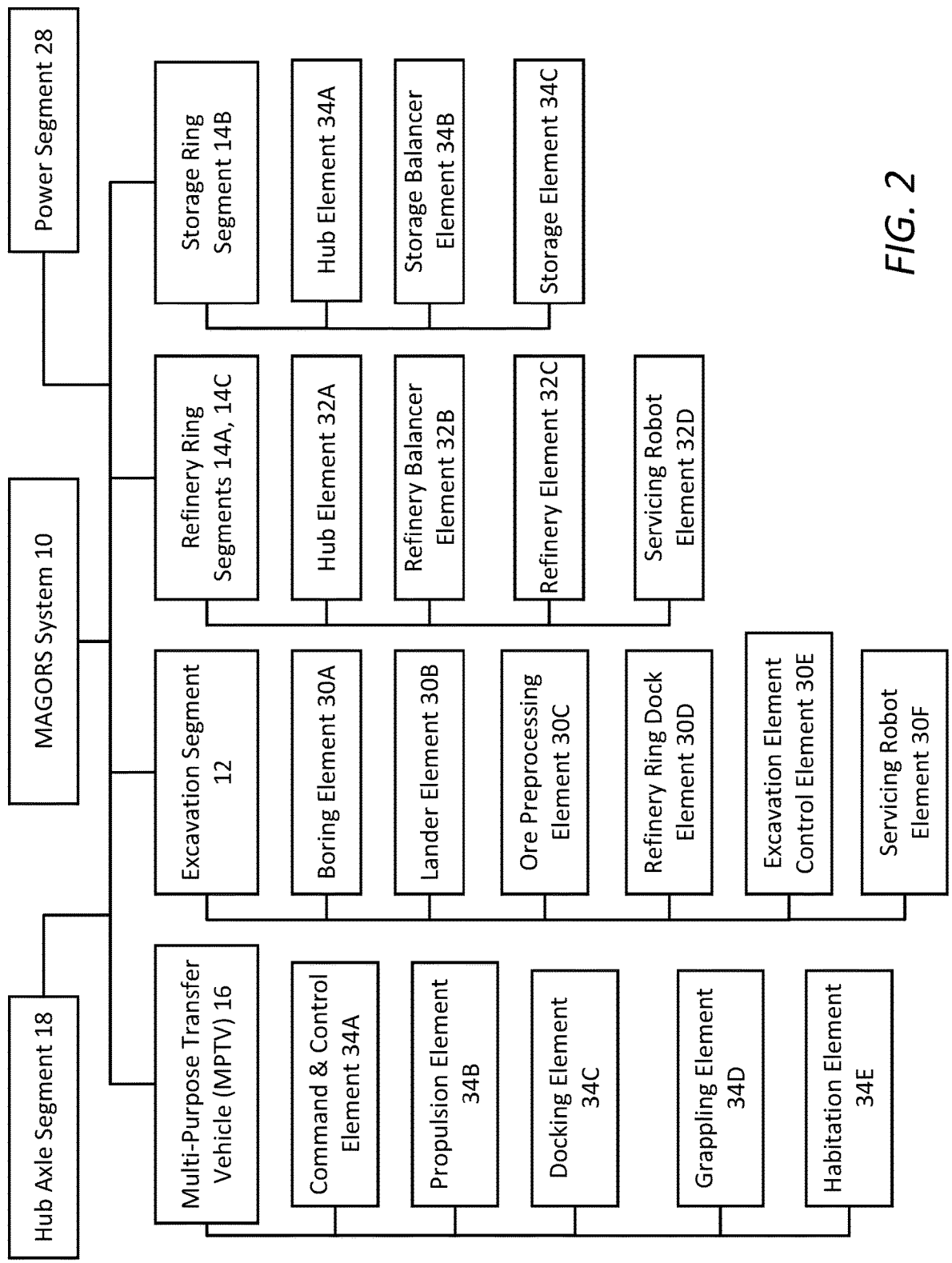
FIG. 2 is a schematic diagram of the orbital refinery spacecraft of FIG. 1 showing components of the excavator segment, the plurality of refinery ring segments, and the multi-purpose transfer vehicle, according to some embodiments.

FIG. 2 is a schematic diagram of MAGORS 10 of FIG. 1 showing components of excavation segment 12, the plurality of refinery ring segments and storage ring segments 14A-14C, multi-purpose transfer vehicle 16 and power segment 28. Components of MAGORS 10 are shown schematically connected in FIG. 2, but can be connected in any suitable fashion to implement the desired effect, including mechanically connected, force-transmitting connections, fluid connections, electrically connected and communicatively connected. Refinery ring segments 14A and 14C and storage ring segment 14B can be coupled to MAGORS 10 via engagement of hub elements 32A and 34A with hub axle segment 18.

Excavation segment 12 can comprise boring element 30A, lander element 30B, ore pre-processing element 30C, refinery ring dock element 30D, excavation element control element 30E, servicing robot element 30F and other optional elements such as a crusher, shredder, and filterer for pre-processing the mined or salvaged raw materials.

Refinery ring segments 14A and 14C can comprise refining rings and can comprise hub elements 32A (e.g., hub rings 46A, 46C), refinery balancer elements 32B, refinery elements 32C and servicing robots 32D.

Storage ring segment 14B can comprise a storage ring and can comprise hub element 36A (e.g., hub ring 46B), storage balancer element 36B and storage elements 36C.

MPTV 16 can comprise command and control element 34A, propulsion element 34B, docking element 34C, grappling element 34D and habitation element 34E.

Multi-purpose transfer vehicle (MPTV) 16 can be configured to provide propulsion for MAGORS 10 to transport MAGORS 10 to asteroid 26. In examples, MAGORS 10 can be launched directly from Earth, can be launched from a transport vehicle or space station, or can be constructed in situ from material mined and refined at local asteroids. MPTV 16 can be remotely operated, autonomously operated, or operated by on-board or close-proximity personnel.

Command and control element 34A can comprise a control module for operating other components of MAGORS 10 and MPTV 16, such as propulsion element 34B, docking element 34C and grappling element 34E. In examples, command and control element 34A can comprise elements as are described with reference to FIG. 7.

In examples, propulsion element 34B of MPTV 16 can comprise the only propulsion units for MAGORS 10. However, in other examples, MAGORS 10 can include other propulsion units. For example, propulsion elements can be included on excavation segment 12. Propulsion element 34B can comprise any suitable propulsion element in the art, particularly those suitable for operation in low or no gravity environments. For example, propulsion element 34B can comprise one or more liquid-propellant rocket thrusters configured to provide multi-directional propulsion to MAGORS 10. MPTV 16 can thus be used to transport MAGORS 10 between the surface to be mined, such as asteroid 16 (FIG. 1), and another location, such as a space station, a launch vehicle or a transport vehicle. Propulsion units can also be attached to refinery ring modules and storage ring modules 20A-24C for transport as required.

Docking element 34C can comprise a component or system configured to couple MPTV 16 with the other components of MAGORS 10. Docking element 34C can comprise any suitable system to allow MAGORS 10 to be releasably coupled to MPTV 16. For example, docking element 34C can comprise a mechanical connection or a connection that additionally includes coupling for electrical power transmission and electronic communication.

Grappling element 34D can comprise a system for allowing MPTV 16 to reach out to and couple to other components. For example, grappling element 34D can comprise a device to allow MPTV 16 to attach to hub axle segment 18 and then pull MPTV 16 toward hub axle segment 18 to allow docking element 34C to engage. Grappling element 34D can comprise a wide variety of robotic arms, as well as can comprise a flexible rope or cable that can be wound on a motor-driven spool to wind and unwind a grappling component, such as a hook or D-ring. Grappling element 34D can additionally include other elements, such as crane or trolley systems, to move the grappling component to different locations about MAGORS 10.

Habitation element 34E can comprise a component of MPTV 16 that can accommodate human occupation. As mentioned, MAGORS 10 can be scaled up to sizes sufficiently large for habitation. Thus, habitation element 34E can provide associated life-support systems, such as oxygen-generating systems, water-generating systems, sanitation systems, and crew nutrition systems (e.g., greenhouse). Habitation element 34E can additionally include access ports to allow for egress and ingress of personnel.

Command and control element 34A can be configured to operate MPTV 16 to perform a plurality of functions. For example, command and control element 34A can operate propulsion element 34B to dock and undock MPTV 16 with MAGORS 10 in coordination with docking element 34C, to maintain the attitude of MAGORS 10 prior to asteroid landing, and land MAGORS 10 on a targeted asteroid. Command and control element 34A can additionally be operated to perform external assembly and maintenance of MAGORS 10, such as by facilitating assembly, disassembly and replacement of modular refining modules 20A-24C using grappling element 34D or servicing robot elements 30F and 32D. Command and control element 34A can also operate grappling element 34D to transfer operational materials (e.g., fuel, replacement parts, mining equipment) to MAGORS 10 from supply spacecraft that cannot directly dock, transfer partially refined materials between refinery ring segments 14A and 14C and storage ring segment 14B that cannot directly transfer, and transfer refined materials and MAGORS 10 modules between MAGORS 10 and transport spacecraft that cannot directly dock to MAGORS. In examples, command and control element 34A (such as in auto-pilot mode) can be configured to transport flight crew to and from MAGORS 10 by commanding the MPTV 16 to travel between MAGORS 10 and other crewed spacecraft such as a space station or crewed capsule, as required. Command and control element 34A can also be used to refuel MPTV 16 when docked with MAGORS 10, such as by using grappling element 34D to transport fuel refined in refinery ring segments 14A and 14C, and stored in storage ring segment 14B to MPTV 16.

Excavation segment 12 can be configured to perform functions to facilitate accessing, obtaining and transporting material from a surface upon which MAGORS 10 is disposed, e.g., asteroid 26, to MAGORS 10, specifically to hub axle segment 18.

Boring element 30A can be used to engage and penetrate a target location, such as asteroid 26. Boring element 30A can comprise components for extending and retracting excavator tool 28 from hub axle segment 18. Excavator tool 28 can comprise any suitable device for separating material from asteroid 26, such as by drilling, breaking, boring, crushing and the like. MAGORS 10 can be provided with a plurality of excavator tools 28 of different varieties to facilitate extracting of different types of materials. MAGORS 10 can be provided with a stock of excavator tools 28 to allow for replacement in the event of breakage or wearing. These excavator tools can remain attached or tethered to MAGORS 10 or travel independently from MAGORS 10 to mine and transport the mined materials.

Lander element 30B can be configured to attach or adhere MAGORS 10 to a target location, such as asteroid 26, such as after being placed in close proximity thereto by MPTV 16. Lander element 30B can comprise gear for stabilizing MAGORS 10 in a desired orientation, such as an upright position relative to asteroid 26 such that, for example, axis A1 is generally perpendicular to the surface of asteroid 26. For example, lander element 30B can comprise a plurality of struts and pads, as well as spikes, pyrotechnically-propelled harpoons, or other features to embed into the surface of asteroid 26 to prevent relative rotation therebetween. Lander element 30B can further comprise means for transporting raw material from excavator tool 28, such as conveyor belts, elevators and the like, to ore preprocessing element 30C. Boring element 30A can be positioned proximate lander element 30B such that excavator tool 28 can be in close proximity to the surface to be mined.

Ore preprocessing element 30C can comprise a system for receiving the raw material gathered by excavator tool 28. Preprocessing element 30C can be configured to prepare raw material for entry into refinery ring segments 14A-14C, such as to convert the raw material into appropriate sized pieces for further processing including activities such as crushing and shredding. Preprocessing element 30C can also perform sorting and filtering operations to facilitate efficient operation of refinery ring segments 14A and 14C and storage ring segment 14B, such as by routing appropriately sized or weight components to particular refining modules and storage modules 20A-24C. Preprocessing element 30C can thus include centrifuges, mechanical separators, sifters, grinders and the like.

Lander element 30B can also comprise a platform upon which other components of MAGORS 10 can be supported, such as in a rotatable fashion. Refinery ring dock element 30D can couple to hub axle segment 18 to allow refinery ring segments 14A and 14C and storage ring segment 14B to be positioned adjacent lander element 30B. Hub axle segment 18 can extend longitudinally along axis A1 from lander element 30B.

Excavation element control element 30E can be in communication with each of the components of excavation segment 12 and the other components of MAGORS 10, and can include components similar to those discussed with reference to FIG. 7. Excavation element control element 30E can control operation of mining and reefing operations of MAGORS 10 and the particular components that allow such operations, such as boring elements 30 and the like.

Servicing robot element 30F can comprise autonomous vehicles or rovers that can be used to access various locations on MAGORS 10, such as to inspect and perform maintenance on excavation segments 12 and other MAGORS segments.

In the illustrated example, two of refinery ring segments 14A and 14C can be configured to carry out refining operations, while storage ring segment 14B can be configured to store material to be used in and produced by the refinery ring segments. Refinery ring segments 14A and 14C and hub elements 32A (e.g., hub rings 46A and 46C) can be configured to rotatably couple to hub axle segment 18. As such, hub elements 32A can comprise annular rings configured to rotate on tracks of hub axle segment 18 with the use of bearings or the like. Hub element 32A can facilitate coupling of refinery element 32C to hub axle segment 18. Refinery element 32C can comprise one of refining modules 20A-24C, which are discussed in detail below. Refinery element 32C can be configured to conduct pyrometallurgical and/or hydrometallurgical refining methods among other methods in various examples. Different refining modules 20A, 22A, 24A, 20C, 22C, and 24C can be configured to conduct different types of refining processes so that all or substantially all of the material of asteroid 26, for example, can be processed. Refinery ring segments 14A and 14C can be configured to refine the raw materials provided by excavation segment 12. Furthermore, as discussed below, refinery ring segments 14A and 14C can be configured to generate and maintain sufficient artificial gravity to perform the refining processes, providing control authority for MAGORS 10 to allow contra-rotating to reduce the net angular momentum and asteroid torque. As such, refinery ring segments 14A and 14C can be adjusted by a controller of MAGORS 10 to automatically maintain rotational balance of refinery ring segments 14A and 14C while each refining module 20A, 22A, 24A, 24A, 24B, and 24C is changing its total mass and the location of the center-of-mass of each of refining modules 20A, 22A, 24A, 24A, 24B, and 24C during the refining process. Additionally, refining modules 20A, 22A, 24A, 24A, 24B, and 24C can be docked and undocking from refinery ring segments 14A and 14C for transport, extended maintenance and reconfiguration, while the controller of MAGORS 10 maintains rotational balance of the other components. Servicing robot element 30F can be employed by the controller of MAGORS 10 to maintain operation of refinery ring segments 14A and 14C.

Storage ring segment 14B can be configured and operated similarly as refinery ring segments 14A and 14C. However, rather than including modules configured specifically to carry out refining procedures, storage ring segment 14B can be configured for storage of raw material and refined material. Refinery ring segment 14B configured as a storage ring can be configured to allow the controller for MAGORS 10 to minimize the net angular momentum of MAGORS 10 offsetting the remaining net angular momentum of refinery ring segments 14A and 14C that have rotational rates that are determined by artificial gravity requirements. Storage ring segment 14B only produces artificial gravity as a byproduct of minimizing the net angular momentum of MAGORS 10. During the material storage and retrieval process, each storage module 20B, 22B and 24B, in the storage ring segment 14B, can change its total mass and the location of the center-of-gravity. The balance of storage ring segment 14B can be controlled by the storage balancer element 36B, e.g., as receptacle port 48 (FIG. 4) is moved as controlled by command and control element 34A, to automatically maintain its rotational balance during the storage process by changing the relative angles of the storage modules to each other. Storage ring segment 14B can be configured to enable the docking and undocking of modules 20B, 22B and 24B for reconfiguration and transfer to transport spacecraft.

Power segment 28 can be used to provide electrical power to MAGORS 10 and the various sub-systems thereof to meet power requirements, in excess of power that can be internally generated by each segment. In examples, power segment 28 can utilize solar energy, but also energy generated by solar light as well as focused heat from parabolic mirrors. Furthermore, power segment 28 can incorporate a nuclear energy power generator, such as a nuclear reactor. In additional examples, power segment 28 can comprise a traveling wave fission reactor that can use depleted and unrefined uranium and compact fusion reactors that use heavy water. Such reactors can be fueled with materials mined from asteroid 26 and refined in MAGORS 10 or another such system. Each of refinery ring segments 14A and 14C and storage ring segment 14B can additionally be provided with a power generating segment to increase production rates.

Figure 3:
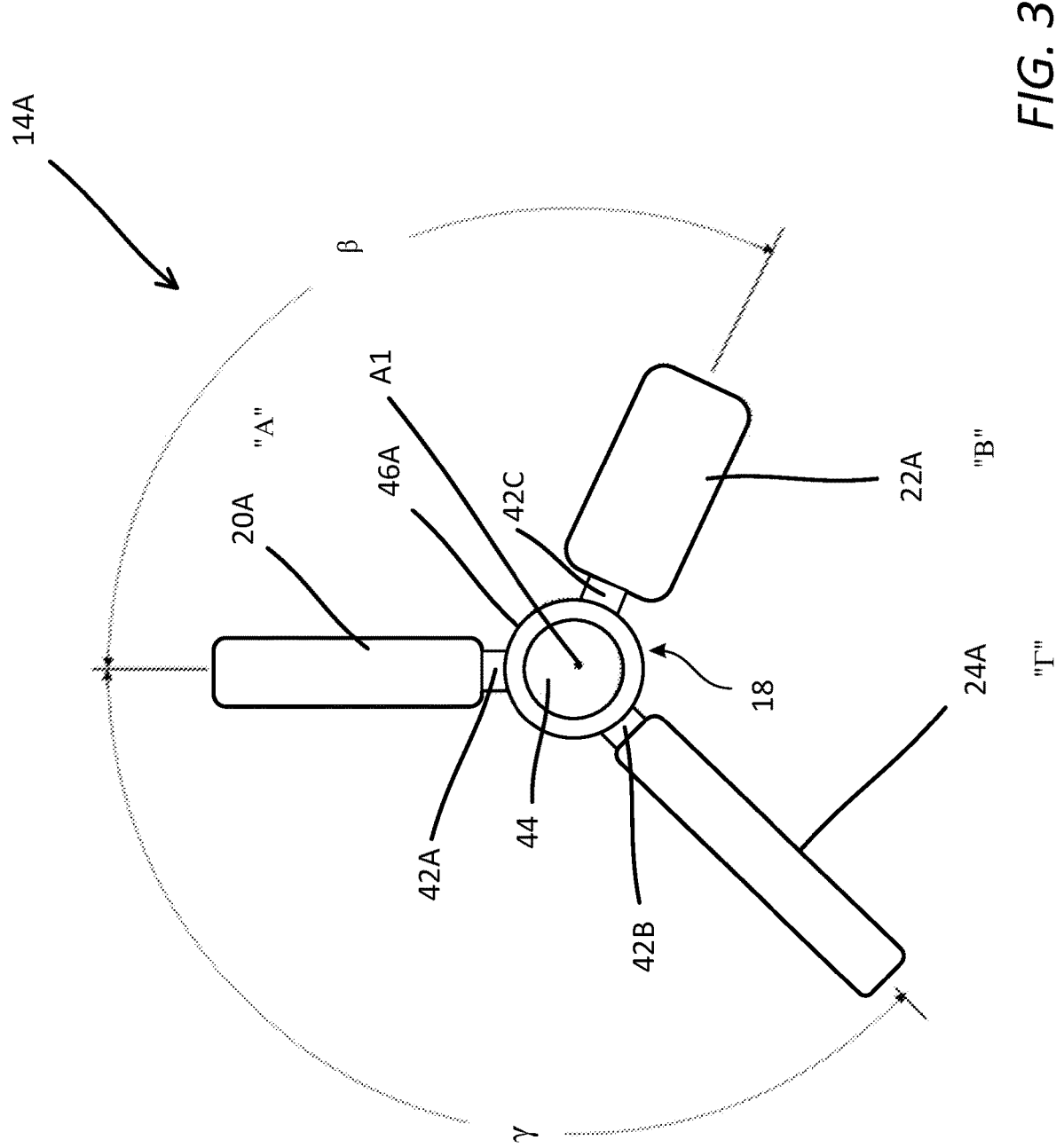
FIG. 3 is a schematic plan view of a refinery ring segment of FIG. 1 comprising first, second and third refining modules connected to a hub, according to some embodiments.

FIG. 3 is a schematic plan view of refinery ring segment 14A comprising first refining module 20A, second refining module 22A and third refining module 24A connected to hub ring 46A via hub couplers 42A, 42B and 42C, respectively. Hub ring 46A can be positioned concentrically about hub axle segment 18 centered on rotational axis A1. Hub ring 46A can comprise hub element 32A of FIG. 2. Couplers 42A, 42B and 42C can be configured to releasably link refining modules 20A, 22A and 24A to hub ring 46A. As such, couplers 42A, 42B and 42C can comprise any suitable coupler that permits material transfer between the interior of hub ring 46A and hub axle 18 to the interior of modules 20A, 22A and 24A. Refining modules 20A, 22A and 24A can also be configured to extrude refined products (e.g., plate steel, beams), at their ends opposite hub ring 46A. Refined products which are extruded in such a manner can be subsequently cut can be propelled into space by their momentum for later retrieval.

Modules 20A, 22A and 24A can be circumferentially positioned around hub ring 46A relative to axis A1 in an adjustable manner. As such, module 20A can be positioned relative to module 24A at angle γ and module 22A can be positioned relative to module 20A at angle β. Thus, the angle between modules 24A and 22A is equal to three-hundred sixty degrees minus (β+γ). Refinery ring segment 14A can be configured with motors to move couplers 42A, 42B and 42C about hub ring 46A. Although only two modules need to be configured to move to adjust these angles, the third module can also be configured to be movable to provide redundancy in case of failure of movement capabilities of the other modules. Ring segments 14B and 14C can be similarly provided with motorized couples. The motors can be configured to move couplers 42A, 42B and 42C about circumferential tracks along hub ring 46A to change angles β and γ. The controller for MAGORS 10 can be configured to operate the motors to change angles β and γ maintain the balance and angular momentum of MAGORS 10 in a desirable manner, as described herein.

In order to provide abbreviations for quantifying rotational imbalances of the refinery ring segments 14A and 14C and the storage ring segment 14B, the first ring module in each ring segment can be symbolically represented as "A", the second ring module in each ring segment can be represented as "B", and the third ring module can be represented as "Γ". Such abbreviations are used in Equation 1, discussed below, to control the rotational imbalance of MAGORS 10.

Figure 4:
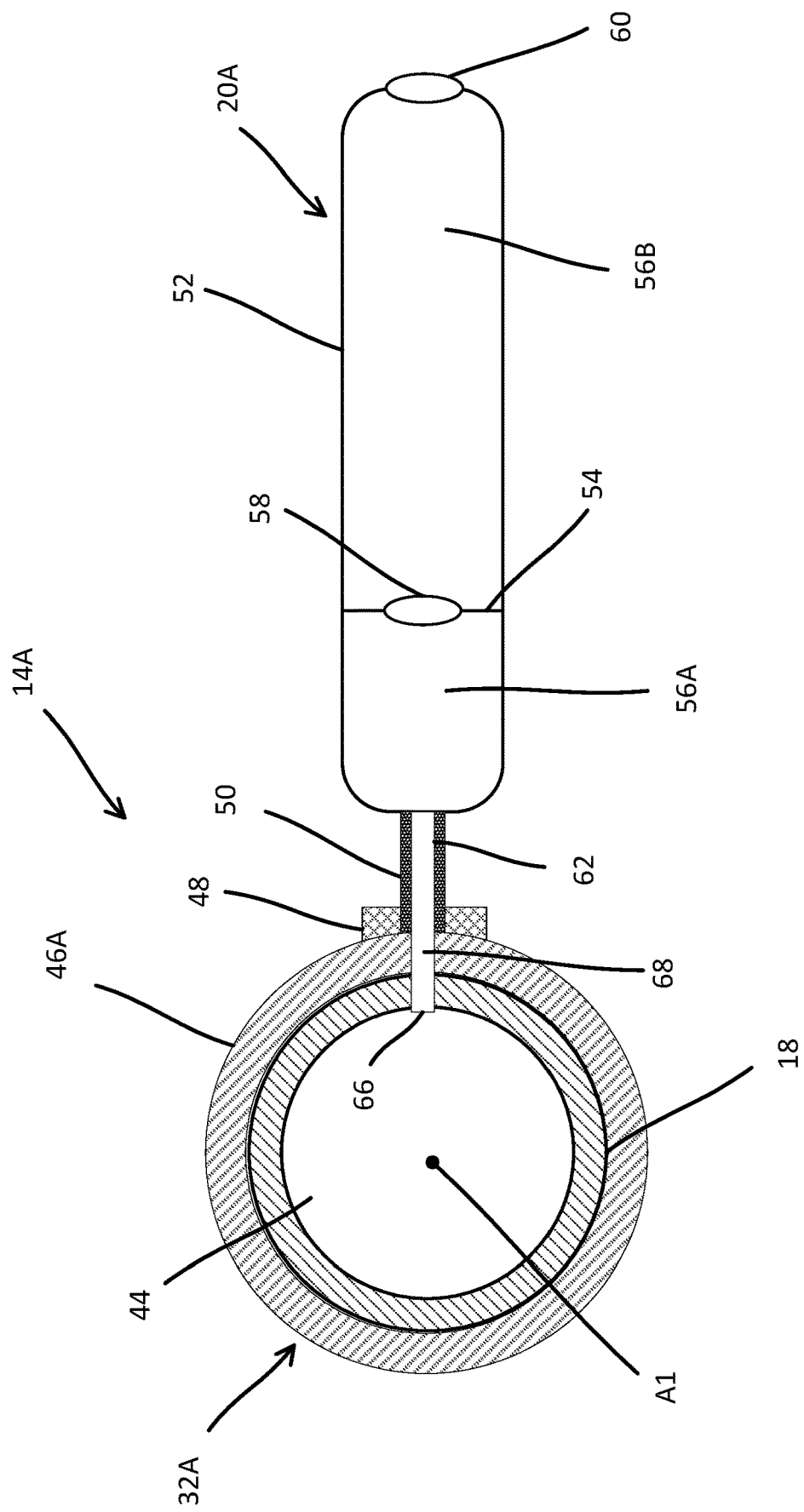
FIG. 4 is a schematic plan view of a refining module of FIG. 3 connected to the hub to show a material processing passageway extending between the hub and an exit portal, according to some embodiments.

FIG. 4 is a schematic plan view of refining module 20A of FIG. 3 connected to hub ring 46A by means of module receptacle port 48. Module receptacle port 48 and module port 50 can comprise coupler 42A (FIG. 3). Hub ring 46A can rotate around hub axle segment 18. FIG. 4 shows a bi-directional materials flow path between interior 44 of hub axle segment 18 and the interior of module 20A. Hub axle segment 18 is centered on rotational axis A1, passes through hub rings 46A-46C of both refinery rings 14A and 14C and storage ring 14B (See FIG. 1). Hub rings 46A-46C can rotate about hub axle segment 18. At the top, hub axle segment 18 can be connected MPTV 16 be means of a docking port at the top of the hub axle segment 18. At the bottom, hub axle segment 18 can be mounted to excavation segment 12. Hub ring 46A can include three module receptacle ports 48, each connected to one refinery or storage module depending on the ring segment. On each ring segment, two of the three module receptacle ports 48 can be configured as mobile ring balancers (e.g., balance element 32B or 36B) wherein the angular position of the module is adjustable relative to axis A1. Each ring balancer can traverse up to half the circumference of hub ring 46A to which it is mounted on. By traversing the exterior of hub ring 46A, the mobile ring balancers (e.g., mobile refining modules or storage modules) change the angles $\beta$ and $\gamma$ defined in Equation 1. Each module receptacle port 48 can include a bidirectional passageway 62 to permit materials to transfer between a module (e.g., refining module 20A) and the hub axle interior 44. Module receptacle port 48 can be connected to module housing 52 of module 20A. Housing 52 can include wall 54 that can divide the interior of housing 52 into first compartment 56A and second compartment 56B. Wall 54 can include valve 58 that can be used to control flow between first compartment 56A and second compartment 56B. Housing 52 can additionally comprise outlet port 60 that can be used to control exit of material from housing 52. Module/Receptacle internal passageway 62 can be configured such that interior 44 of hub ring 46A can be fluidly connected to the interior of housing 52.

The configuration depicted in FIG. 4 is just one exemplary configuration of how refining module 20A can be connected to hub axle segment 18. Such a configuration can be suitable for embodiments of refining module 20A wherein housing 52 comprises a thick skin covering an internal frame. In other examples, housing 52 can be directly coupled to module receptacle port 48. Direct coupling of housing 52 to module receptacle port 48 can effectively eliminate the need for module port 50. Module/Receptacle passageway 62 is not shown to scale in FIG. 4. The size of Module/Receptacle passageway 62 can be sufficiently wide to facilitate suitable material transfer.

Hub ring 46A can be configured to rotate about hub axle segment 18 centered on rotational axis A1. As such, hub ring 46A can be mounted on bearings or the like. Hub ring 46A can include multiple openings, such as at opening 68, and hub axle segment 18 can include multiple openings, such as opening 66, to allow flow of material between interior 44 of hub axle segment 18 and the interior of module housing 52 passing through module receptacle port 48. Openings 66 and 68 can fluidly connect interior 44 of hub axle segment 18 and the interior of module housing 52 as required. Communication between all segments of MAGORS 10 is supported regardless of the positions of the ring segments, their rotation rates, and the relative angle of their modules. Interior 44 can transport raw and refined material between excavation segment 12 and MPTV 16 including each of refinery ring segments 14A and 14C and storage ring segment 14B in between. Generation of artificial gravity by refinery ring segment 14A can cause material to flow from passage 68 radially outward toward outlet port 60. The artificial gravity generated by rotating the refinery ring segments 14A and 14C and storage ring segment 14B is defined by Equation 3.

Module receptacle port 48 and module port 50 can comprise a releasable connection so that other refining modules can be connected to hub ring 46A. Any suitable coupling can be used. In an example, module port 50 can be coupled to module receptacle port 48 using an engagement like that used when a spacecraft docks with the International Space Station, which can facilitate interoperability therewith. Connection of module receptacle port 48 and module port 50 can additionally allow electrical connection therebetween.

Rotation of hub ring 46A about hub axle segment 18 centered on rotational axis A1 can produce artificial gravity for refining module 20A and other refining modules connected to hub ring 46A. The artificial gravity can be used in the refining process within housing 52. For example, the artificial gravity can be used to flow material from interior 44, through passageway 62, through first compartment 56A, valve 58, second compartment 56B and outlet port 60. However, in other examples, flow of material can be facilitated by the use of pumps, conveyors, elevators and the like, for example to transport refined material back into hub axle interior 44.

Housing 52 illustrates one example of a refining module having two compartments 56A and 56B in series connection. However, other refining modules can have other compartments in different configurations. For example, a plurality of different, separate pathways can be incorporated, or pathways having converging and diverging (e.g. parallel) flow paths. As such, housing 52 can be provided with appropriate dividers and valving, etc. Additionally, outlet ports can be provided at locations along the length of housing 52 in addition to or alternatively to outlet port 60. Due to the different configurations of housing 52 and the different processes, e.g., refining processes, each can be configured to carryout, the size, shape, weight and center of gravity can each be different. Furthermore, as material moves throughout each housing, the center of gravity can change.

As discussed below, the angular position of housing 52 relative to axis A1 and other of refining modules 22A and 24A connected to receptacle port 48 can be adjusted by moving the position of receptacle port 48 along the circumference of hub ring 46A so that the controller of MAGORS 10 can fine tune the imbalance of the refinery rings 14A and 14C, and storage ring 14B by the adjusting the module angles as defined in Equation 1.

The rotation rates of the contra-rotating refinery rings are defined by their required artificial gravity levels per Equation 3. However, under most conditions MAGORS 10 would be left with a net angular momentum that would apply an undesirable torque between the excavation segment 12 and the asteroid it is mounted to. In order to achieve and maintain a near-zero-angular momentum artificial-gravity operation of MAGORS 10, the storage ring segment rotation rate can be adjusted to the necessary rotation rate per Equation 2, since artificial gravity in storage modules 20B, 22B and 24B is not essential for the refining processes. One of the problems that any spacecraft that generates artificial-gravity needs to manage is controlling the attitude of the spacecraft while rotating with significant angular momentum. Many spacecraft have operated while spinning rapidly, not for generating artificial gravity, but to generate sufficient angular momentum to resist any change in attitude. However, these spacecraft have been small and low-mass. However, MAGORS 10 can be configured as a large and high-mass spacecraft that is sufficiently large to refine quantities of materials using artificial gravity. Unless a spacecraft is several orders of magnitude smaller or larger than the asteroid the spacecraft is processing, maintaining a stable coupling between the spacecraft and asteroid it is processing will be difficult without controlling the spacecraft attitude so as to prevent applying torque where the spacecraft anchors itself to the asteroid. Generally, changing angular momentum of a spacecraft requires propellant (exceptions include operating in Earth's magnetic field and in atmospheres). The propellant required is amplified by the mass of the propellant. Similar to a launch vehicle, the more massive the spacecraft, the more propellant is required, which in turn requires the spacecraft to be even more massive and require more propellant. However, MAGORS 10 contra-rotates multiple refinery and storage rings (e.g., refinery rings 14A, 14B and 14C) such that the angular momentum of MAGORS 10 can remain at near zero to reduce the torque between the excavation segment 12 and asteroid 26 to an acceptable level, e.g., levels where MAGORS 10 and refining processes can be safely executed without applying undesirable torque to the asteroid 26 and risk MAGORS 10 inadvertently detaching itself from the asteroid. In addition, by rotating more than two rings at any time (e.g., all three of refining rings 14A, 14B and 14C), at least one ring can be stopped for maintenance or nominal operations such as material transfer without changing the angular momentum of MAGORS 10 although under such temporary conditions the artificial gravity levels of the refinery rings may be different than desired. This is accomplished by changing the rotation rates, including direction, of the other rotating rings as necessary as per Equation 3.

Figure 5:
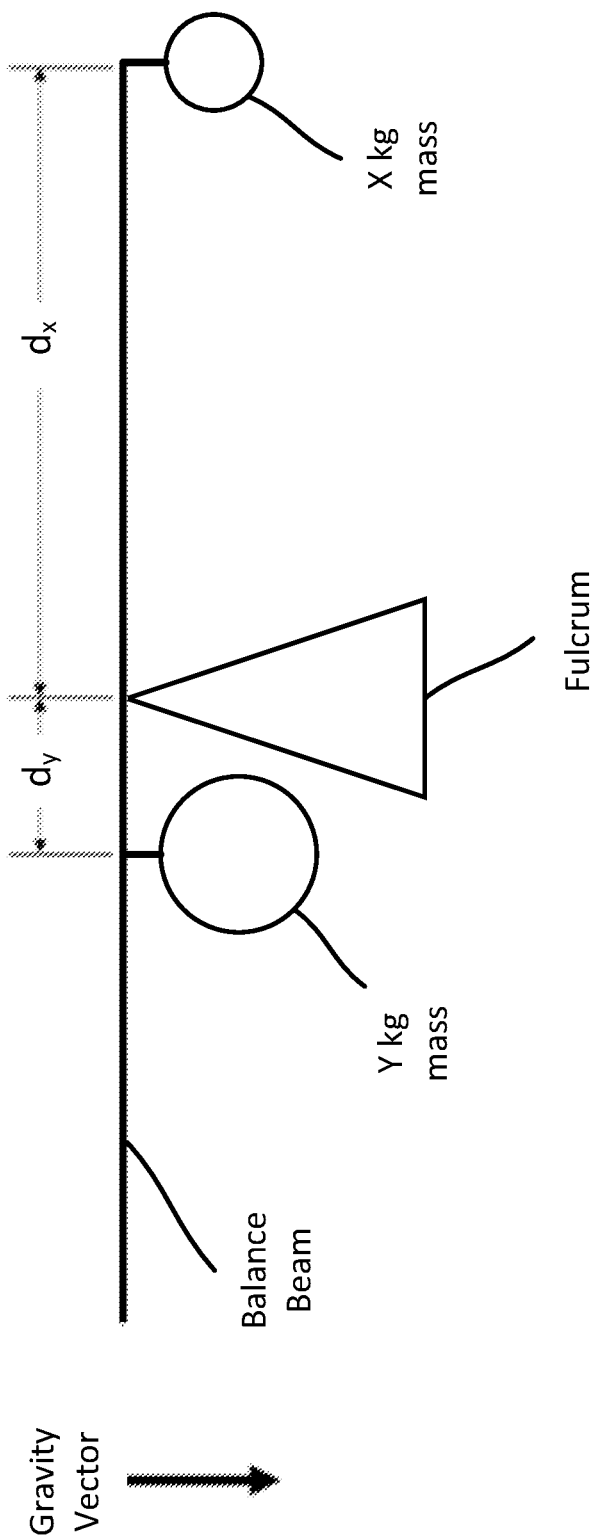
FIG. 5 is a free body diagram illustrating balancing of refining modules connected to a refinery ring segment, according to some embodiments.

FIG. 5 is a free body diagram illustrating balancing two weights along a balance beam under gravity conditions illustrating that a heavier weight can still be balanced by a lighter weight if it is further from the fulcrum. This concept applied to a rotating wheel is the basis for Equation 1 used to balance refining modules connected to a refinery ring segment. However, in the case of a rotating wheel the location of weights near the circumference of the wheel are moved along the rim, as is done when an automotive tire is balanced, rather than moving the weight toward or away from the axis of rotation.

Equation 1 can be used to determine the position of refining modules 20A, 22A and 24A based on their respective centers of mass in kilogram-meters for a given instant in time. The system illustrated by the free body diagram illustrated in FIG. 5 is balanced if and only if $X_{kgm}=Y_{kgm}$ in kilogram-meters, where $X_{kgm}=Xd_x$ and $Y_{kgm}=Yd_y$.

Equation 1: Refinery Ring and Storage Ring Balance Equation $$\text{Imbalance} = \sqrt{(B_{kgm}*\sin\beta + \Gamma_{kgm}*\sin\gamma)^2 + (A_{kgm}+B_{kgm}*\cos\beta + \Gamma_{kgm}*\cos\gamma)^2}$$

where:
Imbalance (kgm): rotational imbalance of the Ring in kg-meters
$A_{kgm}$: Average mass distance of the Alpha Module Element from the axis of rotation in kg-meters.
$B_{kgm}$: Average mass distance of the Beta Module Element from the axis of rotation in kg-meters.
$\Gamma_{kgm}$: Average mass distance of the Gamma Module Element from the axis of rotation in kg-meters.
$\beta$: Angle between the Beta Module Element and the Alpha Module Element
$\gamma$: Angle between the Gamma Module Element and the Alpha Module Element Equation 1 can be simultaneously balanced for each of refinery ring segments 14A and 14C and storage ring 14B since the module element masses and angles are independent for each ring. The balance for each of rings 14A, 14B and 14C can be achieved when the imbalance value for that ring is zero. The average mass distances of the modules, $A_{kgm}$, $B_{kgm}$, $\Gamma_{kgm}$, can be calculated analytically, but due to the complexity of such calculation, it is expected to be more practical to measure the rotational imbalance of the ring segments by means of Inertia Measurement Units (IMUs), with the imbalance of each rotating ring segment generating a sine-like signal at its rotation rate. With the Imbalance and the module angles $\beta$ and $\gamma$ know for more than one set of values, the multiple equations can be simultaneously solved for $A_{kgm}$, $B_{kgm}$, $\Gamma_{kgm}$ continuously during operation to minimize the Imbalance for each ring segment.

Equation 2: MAGORS Angular Momentum Equation $$L=(I_{R1}*\omega_{R1})+(I_R*\omega_{R1})+(I_{R3}*\omega_{R1})$$

where:
L (kg-m²/sec): MAGORS net angular momentum due to the rotation of the refining rings and storage ring
R1: Refinery Segment Ring 1
R2: Refinery Segment Ring 2
R3: Storage Segment Ring
$I_x$ (kgm²): mass moment of inertia for ring segment x where x is either R1, R2, or R3
$\omega_x$ (radians/sec): Rotation rate of x where x is either R1, R2, or R3
Torque sensors on the excavation segment 12 lander legs can be used to confirm the value of L over time.

Equation 3: MAGORS Artificial Gravity (Centripetal Acceleration) Equation $$G=\omega_x^2*r_x*\pi^4/(900^2*9.807)$$

where:
G: number of Earth g's at position r on ring segment x rotating at the rate of $\omega_x$
$\omega_x$ (radians/sec): Rotation rate of x where x is either R1, R2, or R3
$r_x$ (m): distance of the measurement point in a ring segment x module from the rotational axis The ring segment rotation rates $\omega_x$ can be measured by both motor encoders and IMUs in the ring segments. The center of mass of refinery rings 14A and 14C and storage ring 14B should be centered on axis A1 of rotation, otherwise a generally undesirable cyclic disturbance ("wobble") will be introduced, akin to a washing machine in which the contents are not evenly distributed. For MAGORS 10, the center of mass for any one of modules 20A-24C, and hence refinery ring segments 14A, 14B and 14C, can change significantly over time, such as when material moves through the modules. This is particularly so for refineries that operate in batch mode where a quantity or volume of material is introduced into MAGORS 10 and moved completely through modules 20A-24C, rather than in a continuous mode where material is continuously introduced into MAGORS 10 and continuously moved through modules 20A-24C. In the design of MAGORS 10, raw material can flow from hub ring 46A outward into refinery modules 20A, 22A and 24A, and the refined materials flow back into interior 44 of hub axle segment 18 for transfer to other refinery modules for secondary refining or for transfer to storage elements where the material can flow outward for storage and inward for retrieval. The transfer of mass between modules 20A-24C and within each of modules 20A-24C would significantly change the center of mass of each refinery ring segments 14A and 14C and storage ring segment 14B if their modules 20A-24C were statically attached to hub rings 46A-46C. In MAGORS 10, the two refinery ring segments 14A and 14C and the storage ring segment 14B can be attached to hub axle segment 18. Each of ring segments 14A, 14B and 14C can have at least two modules attached to ring module receptacle ports 48 configured as balancer elements 32B, e.g., as receptacle port 48 (FIG. 4) is moved as controlled by command and control element 34A, such that the angles the centerlines of the modules, which pass through rotational axis A1, between adjacent modules can be adjustable to the angles defined by Equation 1. As the center of mass of each of refining modules 20A-24C changes, the position of each of modules 20A-24C can change to maintain the center of mass of each of ring segments 14A, 14B and 14C on or near the rotational axis A1, thus eliminating potential cyclic disturbances from material movement.

Figure 6:
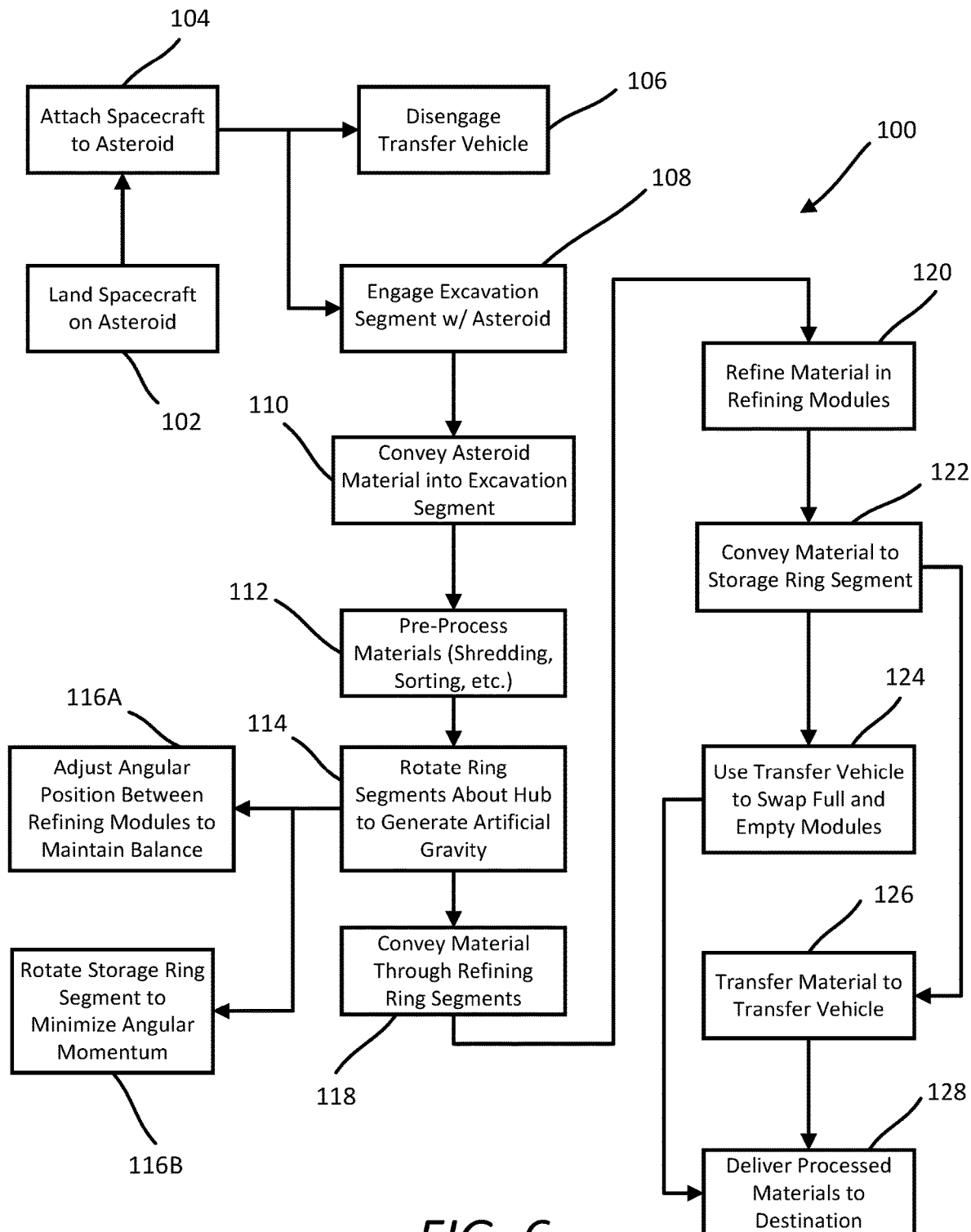
FIG. 6 is a block diagram illustrating methods of collecting and refining substances from an asteroid involving balancing refining modules of a refinery ring segment, according to some embodiments.

FIG. 6 is block diagram illustrating examples of method 100 of collecting and refining substances from an asteroid, or other body such as a derelict satellite, involving balancing refining modules of a plurality of refinery ring segments.

At step 102, MAGORS 10 can be landed on asteroid 26 using MPTV 16. In other examples, MAGORS 10 can be landed on moons or space scrap, such as abandoned satellites. Propulsion element 34B can be used to maneuver MAGORS 10 to asteroid 26. Lander element 30B can be used to engage MAGORS 10 with asteroid 26.

At step 104, MAGORS 10 can be attached to asteroid using lander element 30B. Attachment features of lander element 30B can be used to affix MAGORS 10 to asteroid 26. For example, features of lander element 30B can be engaged with asteroid 26 to prevent relative rotation between asteroid 26 and MAGORS 10.

At step 106, MPTV 16 can be disengaged from hub axle segment 18. MPTV 16 can return to a launch vehicle to position additional refining spacecraft on asteroid 26 or perform other tasks, such as maintenance on MAGORS 10. MPTV 16 can also be used to assist in carrying out steps 124 and 126. However, in examples, MPTV 16 can remain attached to the rest of MAGORS 10 while refining is being carried out.

At step 108, excavation segment 12 can be engaged with asteroid 26. For example, excavator tool 28 of boring element 30A can be engaged with asteroid 26. Boring element 28 can penetrate into asteroid 26 to loosen material for conveying into hub element 32A of MAGORS 10.

At step 110, material from asteroid 26 separated by boring element 28 can be conveyed into hub axle segment 18. For example, lander element 30B can include a conveyor or elevator or the like to move material loosened by boring element 28 into hub axle segment 18.

At step 112, material imported into excavation segment 12 can be pre-processed in preparation for refining processes. As is discussed herein, pre-processing can include anything relevant to conveying material of a certain type, size and kind into relevant areas of refinery ring segments 12A and 12C. As such, pre-processing can include grinding, crushing, shredding, sorting, separating and the like.

At step 114, ring segments 14A, 14B and 14C can be rotated about hub axle segment 18 to generate artificial gravity. For example, ring segments 14A, 14B and 14C can be rotated to generate centripetal force to generate artificial gravity in order to allow material to be moved through refinery ring segments 14A and 14C and storage ring segment 14B. Rotation of ring segments 14A, 14B and 14C can be rotated to cause movement of material through modules 20A-24C.

At step 116A, the angular position between modules 20A-24C can be adjusted to minimize any rotational imbalance caused by step 114. At step 116B, the controller for MAGORS 10 can evaluate Equation 1 and Equation 2 to maintain the near zero imbalances and angular momentum of ring segments 14A, 14B and 14C at or near zero while maintaining the artificial gravity levels of refining ring segments 14A and 14C at their specified levels for their refining processes. Storage ring segment 14B can be rotated in either direction at the rate needed to minimize the net angular momentum of MAGORS 10. Generally, steps 116A and 116B can be performed continuously while refining ring segments 12A and 12C rotate and refining operations are being carried out in steps 114-122.

At step 118, material can be conveyed through modules 20A, 22A, and 24A, and 20C, 22C, and 24C of refining ring segments 14A and 14C, respectively, to carryout refining processes.

At step 120, material can be refined in refining modules 20A, 22A, 24A and 20C, 22C, 24C using techniques such as pyrometallurgical or hydrometallurgical refining processes.

At step 122, material refined in refining modules 20A, 22A and 24A, and 20C, 22C and 24C can be conveyed to storage modules 20B, 22B and 24B such as for storage for later use in other refining processes or manufacturing processes.

At step 124, storage ring segment 12B can be stopped from rotating for a period long enough to allow MPTV 16 to remove full storage modules 20B, 22B, and 24B for use elsewhere and replace said full modules with empty storage modules to store additional mined and refined materials. Alternatively, storage ring segment 12B can be slowed instead of stopped to a speed slow enough to allow MPTV 16 to engage with modules 20B, 22B, and 24B. In additional examples, a fourth ring segment can be added to MAGORS 10 and configured as a storage ring segment to allow for one storage ring segment to be continuously rotated for dynamic purposes while the other can be paused for unloading.

At step 126, MPTV 16 can be engaged with hub axle segment 18, loaded with refined materials as an alternative to transferring full storage modules, and then disengaged to transport these materials to their designated destination. MPTV 16 can be reengaged with docking element 34C to retrieve MAGORS 10. MPTV 16 can be used to return MAGORS 10 to a transport vehicle. A fourth storage ring segment can additionally be used to facilitate this process.

At step 128, refined materials loaded into or attached to MPTV 16 can be used to deliver refined materials to desired destinations, such as other locations on MAGORS 10, other refining systems, manufacturing locations, spacecraft, space stations and the like.

As such, method 100 illustrates examples of a method of generating artificial gravity with refining ring segments 14A-14C per Equation 3, moving asteroid material through modules 20A-24C to carry out refining processes, while balancing modules 20A-24C to maintain balance per Equation 1 and adjusting the storage ring rotation rate per Equation 2 to maintain zero angular momentum of the spacecraft.

Figure 7:
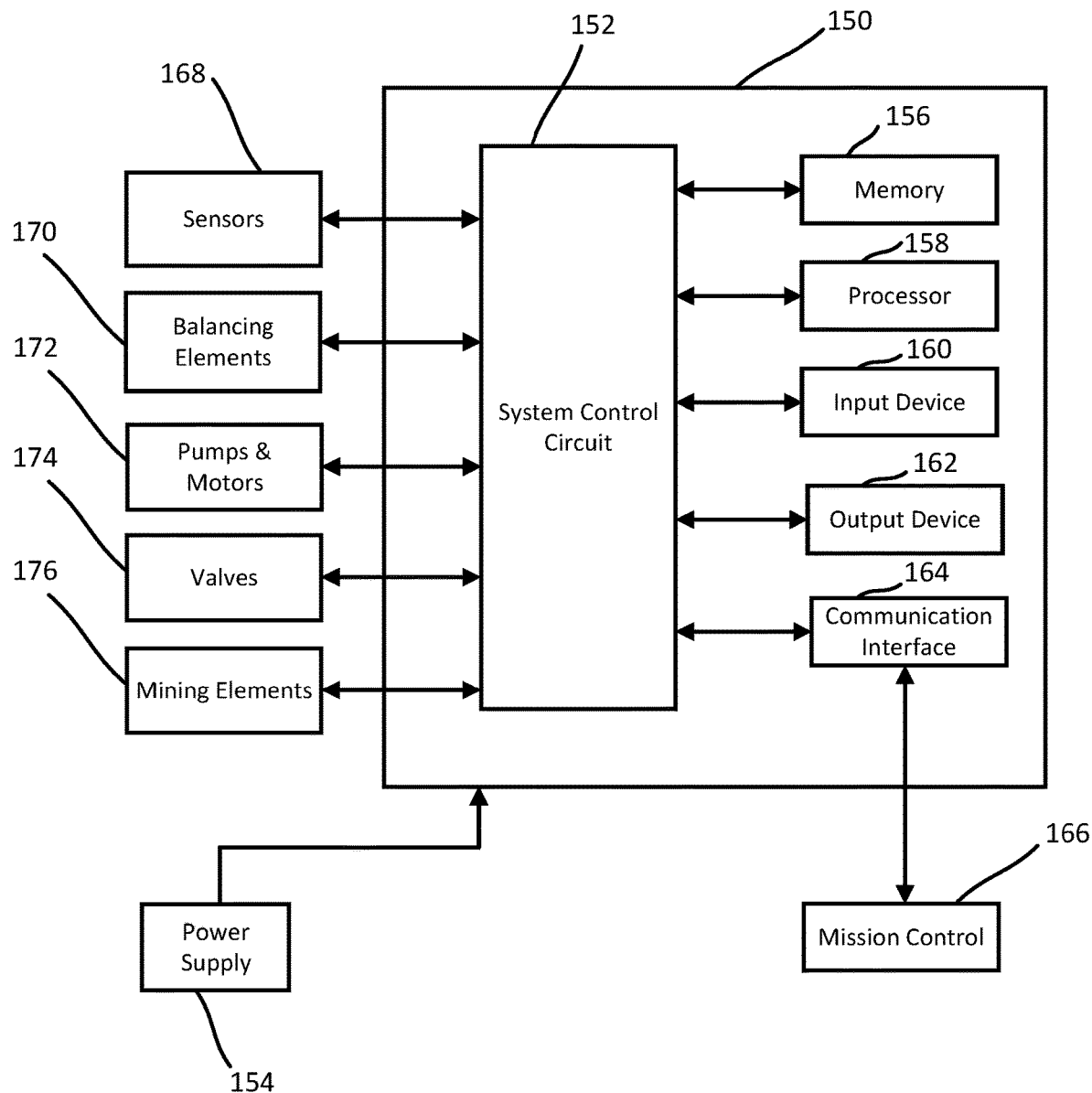
FIG. 7 is a schematic diagram illustrating components of a controller for the orbital refinery spacecraft described with reference to FIGS. 1-5 and with which the methods of FIG. 6 can be executed, according to some embodiments.

FIG. 7 is a schematic diagram illustrating components of controller 150 for MAGORS 10 of FIGS. 1-4 and with which method 100 of FIG. 6 can be executed. Controller 150 can include circuit 152, power supply 154, memory 156, processor 158, input device 160, output device 162 and communication interface 164. Controller 150 can be in communication with mission control 166, which can provide instructions to MAGORS 150 for controlling refining output. Controller 150 can also be in communication with sensors 168, balancing elements 170, pumps and motors 172, valves 174 and mining elements 176. MAGORS is expected to be equipped with a wide variety of sensors to enable reliable and autonomous operations. In particular, motor encoders for the ring segments 14A-14C can used to measure their positions and rotation rates. Motor encoders for module receptacle ports 48 configured as balancing elements 32B can be used to measure the module angles for Equation 1. Inertia measurement units (IMUs) can be used in the hub axle segment 18 to measure imbalances as well as in modules 20A-24C to measure imbalances as well as artificial gravity levels. Torque sensors on the excavation segment 12 landing legs can be used to measure torques between the asteroid 26 and MAGORS 10.

Controller 150 can be configured to control the refining processes carried out in refining modules 20A, 22A, 24A, 20C, 22C, and 24C, as well as the overall operation of MAGORS 10, including the rotation of ring segments 14A, 14B, and 14C to control the angular momentum of MAGORS 10 per Equation 2.

Controller 150 can include various computer system components that facilitate receiving and issuing electronic instructions, storing instructions, data and information, communicating with other devices, display devices, input devices, output devices and the like.

Circuit 152 can comprise any suitable computer architecture such as microprocessors, chips and the like that allow memory 156, processor 158, input device 160, output device 162 and communication interface 164 to operate together. Power supply 154 can comprise any suitable method for providing electrical power to controller 150, such as AC or DC power supplies. Memory 156 can comprise any suitable memory device, such as random access memory, read only memory, flash memory, magnetic memory and optical memory. Input device 160 can comprise a keyboard, mouse, pointer, touchscreen and other suitable devices for providing a user input or other input to circuit 152 or memory 156. Output device 162 can comprise a display monitor, a viewing screen, a touch screen, a printer, a projector, an audio speaker and the like. Communication interface 164 can comprise devices for allowing circuit 152 and controller 150 to receive information from and transmit information to other computing devices, such as a modem, a router, an I/O interface, a bus, a local area network, a wide area network, the internet and the like.

Controller 150 can receive inputs from mission control 166 to coordinate refining processes in modules 20A-24C and the angular momentum of MAGORS 10. Control 166 can assign or instruct the rotation rates of ring segments 14A, 14B and 14C rotate about axis A per Equations 2 and 3, and the angular spacing between modules 20A-24C in ring segments 14A-14C per Equation 1.

Circuit 152 can communicate with, that is, read from and write to, a memory device such as memory 156. Memory 156 can include various computer readable instructions for implementing operation of power plant 10. Thus, memory 156 can include instructions for monitoring requests from mission control 166. Memory 156 can include various computer readable instructions for implementing operation of MAGORS 10. Thus, memory 156 can include instructions for solving Equations 1-3 for MAGORS 10 balancing, angular momentum minimizing, and artificial gravity control. Output of sensors 168 can be provided to circuit 152 for solving Equations 1-3.

Various Notes & Examples

Example 1 is an orbital refinery spacecraft comprising: a hub section defining a longitudinal axis; an excavator segment coupled to the hub section, the excavator segment configured to prepare and convey raw material into the hub section; a first rotary ring segment configured to rotate about the hub section in a first direction, the first rotary ring segment comprising: a first refining module; a second refining module; and a third refining module; wherein a first angular position between the first refining module and the second refining module relative to the longitudinal axis is adjustable and a second angular position between the first refining module and the third refining module relative to the longitudinal axis is adjustable; a second rotary ring segment configured to rotate about the hub section in a second direction opposite the first direction, the second rotary ring segment comprising: a fourth refining module; a fifth refining module; and a sixth refining module; wherein a third angular position between the fourth refining module and the fifth refining module relative to the longitudinal axis is adjustable and a fourth angular position between the fourth refining module and the sixth refining module relative to the longitudinal axis is adjustable; and a third rotary ring segment configured to rotate about the hub section in either direction, the third rotary ring segment comprising: a first storage module; a second storage module; and a third storage module for raw or refined materials; wherein a fifth angular position between the first storage module and the second storage module relative to the longitudinal axis is adjustable and a sixth angular position between the first storage module and the third storage module relative to the longitudinal axis is adjustable.

In Example 2, the subject matter of Example 1 optionally includes a controller configured to: adjust a first rotational speed of the first rotary ring segment and a second rotational speed of the second rotary ring segment at rates required to generate desired the artificial gravity levels for the first and second rotary ring segments; and adjust the first through fourth angular positions for active ring balancing during ring rotation including while materials are being moved within the first through sixth refining modules.

In Example 3, the subject matter of Example 2 optionally includes wherein the controller is configured to adjust the third rotational speed to zero angular momentum of the spacecraft within an acceptable range.

In Example 4, the subject matter of Example 3 optionally includes inertia measurement units located in the first through sixth refining modules, hub section and excavator segment; and encoders located on the first, second and third rotary ring segments to measure positions over time.

In Example 5, the subject matter of any one or more of Examples 2-4 optionally include wherein the controller is configured to adjust the fifth and sixth angular positions for the third rotary ring segment for active ring balancing during ring rotation including while materials are being moved within the first through third storage modules.

In Example 6, the subject matter of Example 5 optionally includes inertia measurement units located in the first, second and third storage modules.

In Example 7, the subject matter of any one or more of Examples 1-6 optionally include wherein the excavator segment is configured to extract the raw material orbiting in space or from a surface or below the surface of a mass to which the excavator segment is engaged; and configured to prepare via crushing, shredding, or filtering the raw material.

In Example 8, the subject matter of Example 7 optionally includes wherein at least one of the first, second, third, fourth, fifth, and sixth refining modules comprises a refining system configured to separate constituent components of the raw material.

In Example 9, the subject matter of Example 8 optionally includes wherein the refining system comprises a pyrometallurgical or hydrometallurgical refining system.

In Example 10, the subject matter of any one or more of Examples 8-9 optionally include wherein at least one of the first, second, and third storage modules comprises: a storage volume for receiving material refined in the refining modules or raw materials prepared by the excavator segment.

In Example 11, the subject matter of any one or more of Examples 1-10 optionally include wherein: the hub section comprises: a cylindrical shaft extending along the longitudinal axis; and a passage extending through the cylindrical shaft; and the first rotary ring segment comprises: a first annular hub disposed concentric with the cylindrical shaft, the first annular hub configured to rotate about the cylindrical shaft; and a plurality of ports mounted to the annular hub to receive the first refining module, the second refining module, and the third refining module.

In Example 12, the subject matter of Example 11 optionally includes wherein the first refining module comprises: a stem configured to extend into one of the plurality of ports; a first compartment connected to the stem; a second compartment connected to the first chamber; and a discharge port.

In Example 13, the subject matter of Example 12 optionally includes wherein the stem is releasably attachable to a receptacle of the port of the plurality of ports.

In Example 14, the subject matter of any one or more of Examples 1-13 optionally include wherein the first refining module, the second refining module, and third refining module have different centers of gravity that change over time during the refining processes.

In Example 15, the subject matter of any one or more of Examples 1-14 optionally include wherein the excavator segment comprises: a lander element for coupling to a surface of an asteroid; and an excavating device for removing material from the asteroid and transferring the material to the hub section.

In Example 16, the subject matter of any one or more of Examples 1-15 optionally include wherein the first, second, third, fourth, fifth, and the sixth refining modules are modular.

In Example 17, the subject matter of any one or more of Examples 1-16 optionally include wherein: the first, second, and third refining modules are releasably attached to the first rotary ring segment; and the fourth, fifth, and sixth refining modules are releasably attached to the second rotary ring segment.

In Example 18, the subject matter of any one or more of Examples 1-17 optionally include at least one of a grappling element or a robot element to facilitate attaching the orbital refinery spacecraft to other components.

In Example 19, the subject matter of any one or more of Examples 1-18 optionally include a transfer vehicle couplable to the hub section, the transfer vehicle configured to control movement of the orbital refinery spacecraft.

In Example 20, the subject matter of Example 19 optionally includes wherein the transfer vehicle comprises: a docking element for coupling to the hub section; and a propulsion element for propelling the orbital refinery spacecraft.

Example 21 is a method of collecting and refining substances from an asteroid, the method comprising: attaching a refining spacecraft to a surface of the asteroid; extracting material from the asteroid; transferring the material into a refining hub; transferring the material from the refining hub to a plurality of refining rings orbiting the refining hub; and controlling orbiting of the plurality of refining rings about the hub to establish and maintain angular momentum of the refining spacecraft at a stable condition.

In Example 22, the subject matter of Example 21 optionally includes maintain the angular momentum of the refining spacecraft within a bandwidth of zero.

In Example 23, the subject matter of Example 22 optionally includes wherein controlling orbiting of the plurality of refining rings about the hub comprises rotating a first of the plurality of refining rings in a first direction and rotating a second of the plurality of refining rings in a second direction opposite the first direction.

In Example 24, the subject matter of Example 23 optionally includes wherein controlling orbiting of the plurality of refining rings about the hub comprises controlling spacing between refining modules in each of the first and second refining rings.

In Example 25, the subject matter of Example 24 optionally includes adjusting a receptacle port connecting one of the refining modules to the hub.

In Example 26, the subject matter of any one or more of Examples 23-25 optionally include wherein controlling orbiting of the plurality of refining rings about the hub comprises controlling speed of each of the plurality of refining rings.

In Example 27, the subject matter of any one or more of Examples 22-26 optionally include wherein each refining module of the plurality of refining modules has a different center of gravity.

In Example 28, the subject matter of any one or more of Examples 21-27 optionally include wherein each of the plurality of refining rings comprises a plurality of refining modules independently releasably mounted to the refining hub.

In Example 29, the subject matter of any one or more of Examples 21-28 optionally include refining the material within the refining modules; and moving extracted material radially through a refining module.

In Example 30, the subject matter of any one or more of Examples 21-29 optionally include landing the refining spacecraft on the asteroid using a transfer vehicle; and separating the transfer vehicle from the hub section.

Example 31 is a method of controlling angular momentum of a refining spacecraft in a reduced gravity environment, the method comprising: landing the spacecraft on a surface of a celestial body to be mined; contra-rotating first and second refining ring segments about a central axis of the spacecraft to generate artificial gravity in the first and second refining ring segments; moving material extracted from the celestial body into first and second refining modules of the first refining ring segment; and adjusting a relative position between the first and second refining modules relative to the central axis to adjust the angular momentum of the refining spacecraft.

In Example 32, the subject matter of Example 31 optionally includes wherein material is moved into the first and second refining modules at different rates.

In Example 33, the subject matter of any one or more of Examples 31-32 optionally include wherein the first and second refining modules have different centers of gravity.

In Example 34, the subject matter of any one or more of Examples 31-33 optionally include rotating a third refining ring segment about the central axis.

In Example 35, the subject matter of Example 34 optionally includes pausing rotation of one of the first and second refining ring segments; and replacing refining modules on the one of the first and second refining ring segments.

In Example 36, the subject matter of any one or more of Examples 31-35 optionally include moving an adjustable receptacle port connecting one of the first and second refining ring modules to a hub.

In Example 37, the subject matter of any one or more of Examples 31-36 optionally include removing one of the first and second refining modules and replacing the one of the first and second refining modules with a third refining module different than the one of the first and second refining modules.

In Example 38, the subject matter of any one or more of Examples 31-37 optionally include refining extracted material in the first refining module; and storing refined material in the second refining module.

In Example 39, the subject matter of Example 38 optionally includes moving extracted material through the first refining module using the artificial gravity.

In Example 40, the subject matter of any one or more of Examples 31-39 optionally include wherein the angular momentum of the refining spacecraft is maintained within a bandwidth of zero.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An orbital refinery spacecraft comprising:
   a hub section defining a longitudinal axis;
   an excavator segment coupled to the hub section, the excavator segment configured to prepare and convey raw material into the hub section;
   a first rotary ring segment configured to rotate about the hub section in a first direction, the first rotary ring segment comprising:
      a first refining module;
      a second refining module; and
      a third refining module;
      wherein a first angular position between the first refining module and the second refining module relative to the longitudinal axis is adjustable and a second angular position between the first refining module and the third refining module relative to the longitudinal axis is adjustable;
   a second rotary ring segment configured to rotate about the hub section in a second direction opposite the first direction, the second rotary ring segment comprising:
      a fourth refining module;
      a fifth refining module; and a sixth refining module;
   wherein a third angular position between the fourth refining module and the fifth refining module relative to the longitudinal axis is adjustable and a fourth angular position between the fourth refining module and the sixth refining module relative to the longitudinal axis is adjustable; and
a third rotary ring segment configured to rotate about the hub section in either direction, the third rotary ring segment comprising:
   a first storage module;
   a second storage module; and
   a third storage module, each of the storage modules for raw or refined materials;
      wherein a fifth angular position between the first storage module and the second storage module relative to the longitudinal axis is adjustable and a sixth angular position between the first storage module and the third storage module relative to the longitudinal axis is adjustable.

2. The orbital refinery spacecraft of claim 1, further comprising a controller configured to:
   adjust a first rotational speed of the first rotary ring segment and a second rotational speed of the second rotary ring segment at rates required to generate the desired artificial gravity levels for the first and second rotary ring segments; and
   adjust the first through fourth angular positions for active ring balancing during ring rotation including while materials are being moved within the first through sixth refining modules.

3. The orbital refinery spacecraft of claim 2, wherein the controller is configured to adjust the third rotational speed to zero angular momentum of the spacecraft within an acceptable range.

4. The orbital refinery spacecraft of claim 3, further comprising:
   inertia measurement units located in the first through sixth refining modules, hub section and excavator segment, each inertia measurement unit configured to generate a sine-like signal from measurements of a rate of rotation of the refining modules over time; and
   encoders located on the first, second and third rotary ring segments to measure positions over time.

5. The orbital refinery spacecraft of claim 2, wherein the controller is configured to adjust the fifth and sixth angular positions for the third rotary ring segment for active ring balancing during ring rotation including while materials are being moved within the first through third storage modules.

6. The orbital refinery spacecraft of claim 5, further comprising:
   inertia measurement units located in the first, second and third storage modules segment, each inertia measurement unit configured to generate a sine-like signal from measurements of a rate of rotation of the storage modules over time.

7. The orbital refinery spacecraft of claim 1, wherein the excavator segment is configured to extract the raw material from one or more input masses orbiting in space, including extracting the raw material from a surface or below the surface of a mass of the one or more input masses to which the excavator segment is engaged; and configured to prepare via crushing, shredding, or filtering the raw material.

8. The orbital refinery spacecraft of claim 7, wherein at least one of the first, second, third, fourth, fifth, and sixth refining modules comprises a refining system configured to separate constituent components of the raw material.

9. The orbital refinery spacecraft of claim 8, wherein the refining system comprises a pyrometallurgical or hydrometallurgical refining system.

10. The orbital refinery spacecraft of claim 8, wherein at least one of the first, second, and third storage modules comprises:
   a storage volume for receiving material refined in the refining modules or raw materials prepared by the excavator segment.

11. The orbital refinery spacecraft of claim 1, wherein:
   the hub section comprises:
      a cylindrical shaft extending along the longitudinal axis; and
      a passage extending through the cylindrical shaft; and
   the first rotary ring segment comprises:
      a first annular hub disposed concentric with the cylindrical shaft, the first annular hub configured to rotate about the cylindrical shaft; and
      a plurality of ports mounted to the annular hub to receive the first refining module, the second refining module, and the third refining module.

12. The orbital refinery spacecraft of claim 11, wherein the first refining module comprises:
   a stem configured to extend into one of the plurality of ports;
   a first compartment connected to the stem;
   a second compartment connected to the first compartment; and
   a discharge port.

13. The orbital refinery spacecraft of claim 12, wherein the stem is releasably attachable to a receptacle of the port of the plurality of ports.

14. The orbital refinery spacecraft of claim 1, wherein the first refining module, the second refining module, and third refining module have different centers of gravity that change over time during the refining processes.

15. The orbital refinery spacecraft of claim 1, wherein the excavator segment comprises:
   a lander element for coupling to a surface of an asteroid; and
   an excavating device for removing material from the asteroid and transferring the material to the hub section.

16. The orbital refinery spacecraft of claim 1, wherein the first, second, third, fourth, fifth, and the sixth refining modules are modular.

17. The orbital refinery spacecraft of claim 1, wherein:
   the first, second, and third refining modules are releasably attached to the first rotary ring segment; and
   the fourth, fifth, and sixth refining modules are releasably attached to the second rotary ring segment.

18. The orbital refinery spacecraft of claim 1, further comprising at least one of a grappling element or a robot element to facilitate attaching one segment or one element of the orbital refinery spacecraft to one or more other segments or elements of the orbital refinery spacecraft.

19. The orbital refinery spacecraft of claim 1, further comprising a transfer vehicle couplable to the hub section, the transfer vehicle configured to control movement of the orbital refinery spacecraft.

20. The orbital refinery spacecraft of claim 19, wherein the transfer vehicle comprises:
   a docking element for coupling to the hub section; and
   a propulsion element for propelling the orbital refinery spacecraft.

* * * * *